United States Patent
Mattson

(10) Patent No.: US 6,885,632 B1
(45) Date of Patent: Apr. 26, 2005

(54) METHOD AND SYSTEM FOR SIGNAL DEGRADE (SD) INFORMATION PASSTHROUGH IN T-MUX SYSTEMS

(75) Inventor: James R. Mattson, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 951 days.

(21) Appl. No.: 09/740,931

(22) Filed: Dec. 21, 2000

(51) Int. Cl.$^7$ ................................................ H04L 1/00
(52) U.S. Cl. ................................................ 370/216
(58) Field of Search ........................... 370/215–219, 370/222–225, 238, 242, 241.1, 252, 319, 337, 474, 476, 501, 503, 505, 516, 517, 535–544, 557, 907; 398/1, 2, 5, 7, 8, 10, 27; 714/4, 47, 48, 51, 704, 708, 712

(56) References Cited

U.S. PATENT DOCUMENTS

| | | | |
|---|---|---|---|
| 5,216,666 A | * 6/1993 | Stalick | 370/16.1 |
| 5,490,142 A | * 2/1996 | Hurlocker | 370/84 |
| 5,841,760 A | * 11/1998 | Martin et al. | 370/242 |
| 6,011,802 A | * 1/2000 | Norman | 370/466 |
| 6,125,104 A | * 9/2000 | Shiragaki et al. | 370/216 |
| 6,298,038 B1 | * 10/2001 | Martin et al. | 370/216 |

OTHER PUBLICATIONS

CDS Magazine—Feb. 1999—vol. 5, No. 2: Standards Protocols: The Synchronous Optical Network (http://www.csdmag.com/main/1999/02/9902standards.htm).

CSD Magazine—Mar. 1999—vol. 5, No. 3: Standards Protocols: SONET Frame Structures (http://www.csdmag.com/main/1999/03/9903standards.htm).

CSD Magazine—Apr. 1999—vol. 5, No. 4: Standards Protocols: SONET Payload Services: Delivery of User Traffic (http://www.csdmag.com/main/1999/04/9904standards.htm).

CSD Magazine—May 1999—vol. 5, No. 5: Standards Protocols: SONET Control and Management (http://www.csdmag.com/main/1999/05/9905standards.htm).

CSD Magazine—Jun. 1999—vol. 5, No. 6: Standards Protocols: SONET Protection Switching (httm://www.csdmag.com/main/1999/06/9906standards.htm).

* cited by examiner

Primary Examiner—Wellington Chin
Assistant Examiner—Mark A Mais
(74) Attorney, Agent, or Firm—Max R. Wood; Ogilvy Renault

(57) ABSTRACT

Signal degrade (SD) propagation is provided for transparent mux/demux (T-Mux) systems to enable timely and more accurate performance monitoring and protection capabilities. A transparent node comprising two T-Muxs connected via a high-rate span between first and second sites common to a plurality of trib telecommunication systems provides continuity to all tribs and maintains the lower bit rate systems through the span. SD indicia, such as bit errors, on respective incoming trib signals at a T-Mux are accumulated over a relatively short fixed period. The SD information is encoded in a message byte and transported, alternately with a synchronization message, to the companion T-Mux in otherwise available signaling overhead. Upon receipt of the T-Mux message, for each trib signal, the downstream T-Mux generates a corresponding signal degrade condition on outgoing trib signals.

31 Claims, 2 Drawing Sheets

METHOD AND SYSTEM FOR SIGNAL DEGRADE (SD) INFORMATION PASSTHROUGH IN T-MUX SYSTEMS

FIELD OF THE INVENTION

This invention relates to operations, administration, maintenance and provisioning (OAM&P), particularly performance monitoring, of transported signals in a telecommunications system and, more particularly, to a method and system for signal degrade (SD) information passthrough in a transparent multiplexer/demultiplexer (T-Mux) system.

BACKGROUND OF THE INVENTION

A significant amount of resources are allocated to telecommunications network architectures, as well as OAM&P to ensure highly reliable data communications. Reliable performance depends on reliable and timely performance monitoring for verification and protection when required. Optical fiber based telecommunication systems in particular require accurate performance monitoring solutions given the higher traffic capacities and related costs.

The Synchronous Optical Network (SONET) standard formulated by the Exchange Carriers Standards Association (ECSA) for the American National Standards Institute (ANSI) provides a common policy for optical transport. The standard incorporates information protocols that define how overhead services are used by transmission equipment to provide a range of performance monitoring services. Protection switching and performance monitoring services use statistical measures to automatically isolate and identify areas of the network experiencing signal degrade (SD). Fault management services not only detect and process faults locally but also signal measured phenomena quickly to neighboring equipment that may be susceptible to faults detected elsewhere in the network.

Briefly, digital communication over a SONET network is based on a synchronous transport system frame protocol, STS-n. The SONET frame is partitioned into a transport overhead (TOH) part consisting of three columns and nine rows, and a synchronous payload envelope (SPE) part consisting of 87 columns, one column of which is for path overhead (POH). TOH consists of three columns and three rows of section overhead (SOH) and three columns and six rows of line overhead (LOH). Of the 810 bytes in the 9 row by 90 column byte stream in each STS-1 frame, 36 bytes are thus reserved for SONET overhead information. The data therein provides the control information for each of three specific layers (signal, line and path) within the SONET standard. Each SONET frame is transmitted at a rate of 8 kHz (i.e. every 125 µsec). Transmissions rates are increased by increasing the number of STS-1 frames transmitted at the 8 kHz rate. Thus for the optical carrier (OC) rate OC-48, 48 STS-1 frames, (STS-1#1, STS-1#2 . . . STS-1#48, collectively referred to as a STS-48 frame), are transmitted every 125 µsec.

One performance monitoring measure of a telecommunication network's quality of service is the bit error rate (BER) of the traffic being carried through the network. Each of the section, line and path layers represented in the SONET STS-1 overhead includes a one byte compounded bit interleaved parity (BIP-8) field (B1, B2 and B3 respectively) that can be used to calculate BER for transmitted signals at points throughout the network. As an example, and as is understood by those skilled in the art, line BER can be calculated at a receiving site by comparing the BIP-8 value received in a B2 byte to a BIP-8 value determined at the receiving site from the bytes of the STS-1 frame element associated with the B2 value.

Bellcore, an initiator of the SONET standard, has published Generic Requirement GR-253-CORE, incorporated by reference herein, setting out, among other things, error count statistics and maximum detection times that each SONET network element (NE) is expected to maintain, by layer. The statistics are collected for a current measured period and for historical periods. For example, included in the statistics collected is a measure of Coding Violations (CVs) representing a raw count of bit errors detected using the BIP-8 for each layer. These statistics are further collected in time-interval buckets for historical performance monitoring. The buckets accumulate 15 minute and 24 hour interval data. Each NE maintains up to eight hours of 15-minute interval data and 48 hours of 24-hour data. The data may be collected by a central data management system for longer-term use. From these accumulated statistics, operators and network users can review both the recent and historic behaviors of their network. Moreover, protection switching activities may be performed to identify and avoid signal degrade problems.

Trite as it may sound, it is very important to maintain timely and accurate BER calculation abilities when transporting SONET frames.

Applicant's U.S. Pat. No. 5,841,760, which issued Nov. 24, 1998 to Martin et al., discloses a transport node suitable for SONET telecommunications. The node comprises a pair of transparent multiplexer/demultiplexers provided at two sites and connected by a high-rate span. The transport node provides continuity of all tributary (trib) signals and maintains one or more lower bit rate linear or ring trib systems through the higher bit rate span. Each lower bit rate trib system operating through the transport node operates as if it were directly connected without the higher bit rate midsection.

For the forward direction of the traffic, the T-Mux comprises a multi-channel receiver for receiving the trib signals (e.g. four OC-48 signals), processing each trib signal to derive a respective trib SPE and a trib OH. The trib SPEs are multiplexed into a supercarrier SPE and the trib OHs signals are processed to generate a supercarrier OH. A supercarrier transmitter maps the supercarrier SPE and the supercarrier OH into a supercarrier signal (e.g. an OC-192 signal) and transmits the signal over the high-rate span. Reverse operations are effected for the reverse direction of traffic. With this transport node, an entire ring trib system, for example, does not have to be upgraded to a higher line rate due to fiber exhaust on a single span.

In order to maintain transparency, and avoid any provisioning or additional costs at trib sites served by the transport node, a trib site receiving trib signals through the transport node should be able to compile performance monitoring statistics, such as BER, for the trib signal it receives as if it received the signal directly. That is, as if the receiving trib site was located at the upstream end of the transport node and not the downstream end. Moreover, the receiving trib site must be able to calculate such statistics in a timely manner. Such functionality is also necessary because, to maintain transparency, the transport node does not perform protection switching.

Under the SONET standard, a particular STS-1 received by a trib site from a T-Mux at the downstream end of the transport node is not necessarily identical to the corresponding STS-1 received by the upstream T-Mux. There are at least three reasons that may explain the differences. First, there may be errors introduced over the high-rate span or, second, over the low rate span between the downstream T-Mux and the trib site. Third, overhead bytes, particularly LOH payload pointers H1, H2 or H3 used to specify the beginning of an SPE within the frame may be adjusted by either the upstream or downstream T-Mux. Such adjustments are necessary to accommodate frequency offsets between a received STS-1 frame and the local system frame. Any such adjustment causes a further change to B2 computed for the particular STS-1 frame for transmission to the trib receiving site. Thus, if the receiving site merely calculated performance statistics on the frames it received, the statistics would reflect the presence of the T-Mux to a substantial degree.

It is therefore necessary to passthrough upstream trib signal degrade information such as BER as determined at the upstream end of the transport node to the downstream end for propagation to the respective receiving trib sites.

Martin et al. describe a method for determining BER for each trib signal at the upstream T-Mux and passing the error rate through to the downstream T-Mux by encoding a message byte in unused STS-n frame overhead. The detected error rate is then propagated to the receiving trib sites by inserting an equivalent number of errors into outgoing signals. Errors may be introduced by inverting an equivalent number of bits of B2. The method provides a B2 error rate transfer with one-half decade accuracy.

The integration time allowed for detection of an incoming BER is of an order of minutes according to Bellcore GR-253-CORE. A delay in measurement and error transfer propagates to the downstream trib sites and could effectively double the BER detection time at those sites.

The delay in error propagation also affects the time at which the bit error information is reported by the downstream site's Performance Monitoring (PM) system. Single bit errors that may be reported by an OC-192 T-Mux may never be propagated to a downstream OC-48 site. It is therefore desirous to provide signal degrade propagation that is both timely and necessarily reflective of measured error rates.

As a result, there is a need to provide an improved method and system for propagating signal degrade information in transparent multiplexer/demultiplexer (T-Mux) systems.

SUMMARY OF THE INVENTION

It is an object of the present invention to provide an improved method for propagating signal degrade information in transparent multiplexer/demultiplexer (T-Mux) systems.

The invention therefore provides, in a telecommunication system for transporting a telecommunication signal comprising signal overhead and payload between a multitude of sites, a method of propagating signal degrade (SD) information of the signal received at a first site to a second site. The method comprises steps of, at the first site, sampling the signal received for SD indicia over a sampling period to determine a SD information; encoding a SD message indicating either the SD information as sampled or a synchronization code; and mapping the SD message into a timeslot of signal overhead, for transporting to the second site. The sampling period is selected to provide SD information passthrough in accordance with predetermined performance monitoring criteria.

The method may further comprise, at the second site, monitoring the timeslot of signal overhead in the signal received for a change in the value of the SD message; and if the value has changed, decoding the SD message to determine the SD information. Further, the method may further comprise, at said second site, generating an SD condition corresponding to the decoded SD information in signal overhead of a signal transported to another site in the telecommunications system.

Preferably, the signal degrade indicia are bit errors and the step of encoding comprises a step of encoding the SD message with a value indicative of an exact bit error count if a count of bit errors on the trib signal for the sampling period is less than a threshold value; otherwise, coding the SD message with a value indicative of an approximation of the error count.

In accordance with a further aspect of the invention, the step of encoding may comprise encoding the SD message with the SD information for mapping for a first portion of a next sampling period and encoding the SD message with a synchronization code indicating no SD information for mapping for a remainder of the next sampling period.

Additionally, in accordance with a particular aspect of the invention the method of propagating is suited for a situation in which the first and second sites each comprise a transparent multiplexer/demultiplexer (T-Mux) for transparently transporting a plurality (K) of said telecommunication signals between said first and second sites over a high-rate span, each of said K signals travelling on a corresponding tributary (trib) telecommunication system and wherein each of the steps are respectively performed for each of the corresponding K signals.

In accordance with another aspect, the invention provides, in a plurality (K) of trib systems for transporting trib signals between a multitude of sites, all trib systems having in common a first and second site, the trib signals being multiplexed onto a supercarrier signal carried between the first and second sites over a high-rate span with no change in the provisioning of any of said trib systems, a method of propagating a bit error rate (BER) of each trib signal received at the first site for carrying to the second site. This method comprises steps of, at the first site, sampling each trib signal received for any bit errors over a sampling period to determine SD information for each signal; encoding a SD message ($Msg_K$) for each signal indicating either SD information or a synchronization code; and mapping $Msg_K$ into a timeslot of signal overhead for transporting to the second site. The sampling period is selected to provide SD information passthrough in accordance with predetermined performance monitoring criteria.

In accordance with another aspect of the invention, there is provided, in a transparent multiplexer/demultiplexer for transparently transporting a plurality (K) of trib signals between a first and second site over a high-rate span, the trib signals comprising forward trib signals multiplexed onto a forward supercarrier signal for transmission and reverse trib signals demultiplexed from a reverse super carrier signal upon reception, a system of propagating signal degrade (SD) information of each trib signal. The system comprises means for sampling each of the forward trib signals and for counting any bit errors over a sampling period to determine SD information; means for encoding an SD message ($Msg_K$) indicating either SD information or a synchronization code; and means for mapping $Msg_K$ into a timeslot of signal overhead of the forward supercarrier signal for transport to the second site. The sampling period is selected to provide SD information passthrough in accordance with predetermined performance monitoring criteria.

Accordingly, the method and system for B2 error and other signal degrade information propagation uses a relatively short, fixed period sampling of the incoming errors and two different encoding schemes for the SD information message. Detected error counts and approximation of BER are based on the raw B2 error counts detected during a fixed sampling period of 100 milliseconds and not those integrated for fault detection or other performance monitoring.

After each sampling, if the number of errors detected exceeds a predetermined range available in the SD information message byte, then a lookup table is used to encode the approximate BER within one-half decade. One bit of the message byte is used to indicate the type of information the remaining 7 bits contains either BER estimate or absolute bit error count.

This encoded single byte message is transmitted to the downstream T-Mux egress point (e.g. OC-48 transmitter). The downstream T-Mux transmission system receives the message, determines whether the value has changed and, if so for non-zero errors, which type of encoded byte it has received. In response to the decoded value, either: 1) the exact number of B2 error bits are output during the next sampling period; or 2) a predetermined number of errored B2 bits equivalent to the BER approximation based on the BER index sent from upstream are output during the next sampling period.

The T-Mux implementation preferably uses a 100 millisecond sample rate for OC-48 trib systems with an preferred exact bit error threshold of 127. This results in near absolute bit error transfers when the incoming OC 48 BER is less then approximately 5E-7. Propagation delay for single bit errors will be less than two sample periods in a worst case scenario. This fixed propagation delay ensures that the Performance Monitoring counts for Line CV will be reported by both the T-Mux and downstream trib systems within the same or, at worst, adjacent 15-minute PM reporting periods.

BRIEF DESCRIPTION OF THE DRAWINGS

The invention will now be described by way of example only, and with reference to the following drawings, in which.

DETAILED DESCRIPTION OF THE PREFERRED EMBODIMENT

Figure 1:
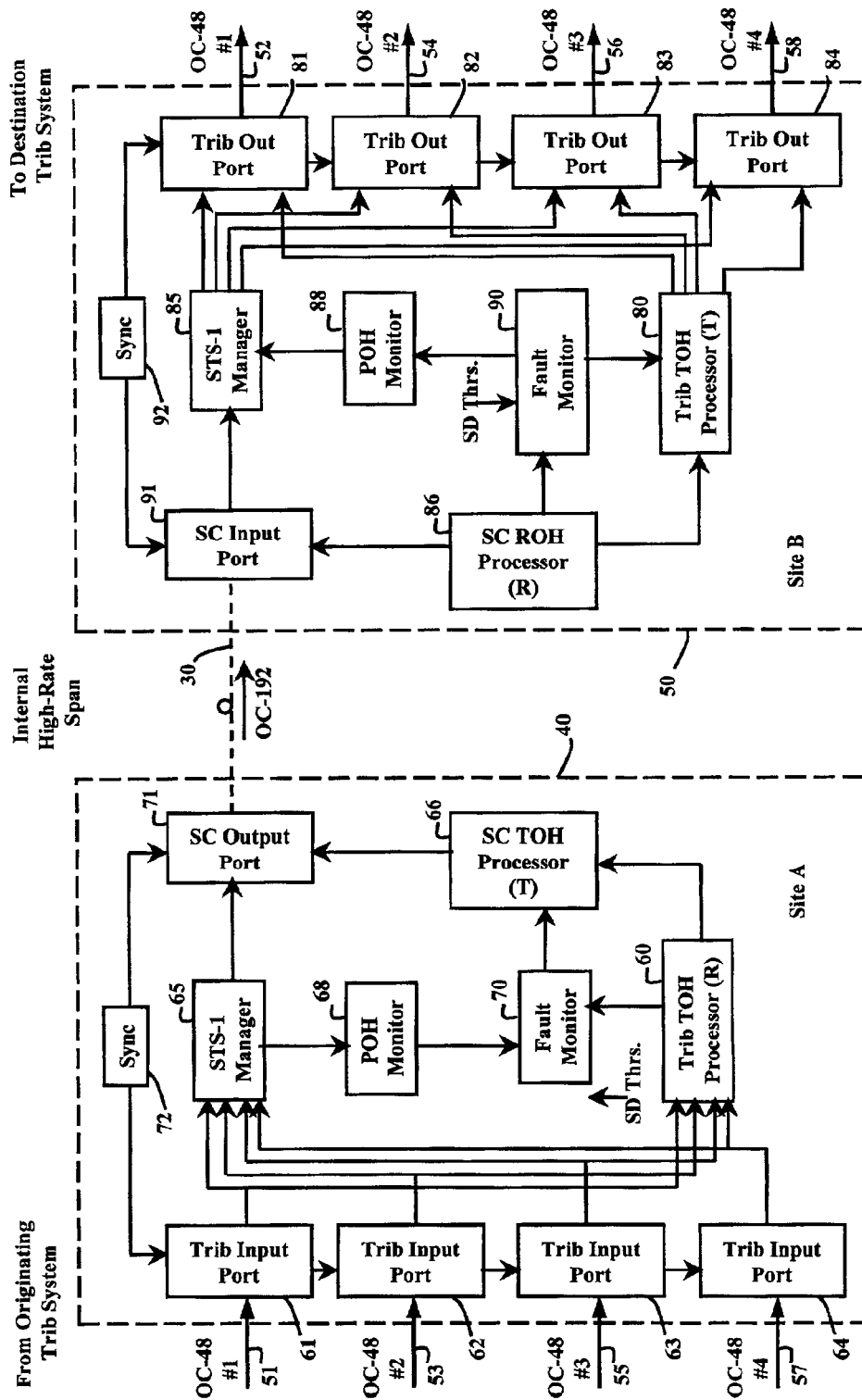
FIG. 1 is a block diagram of a prior art transparent transport nodes referred to as a pair of T-Muxs.

The present invention is best understood with reference to the prior art of Applicant's U.S. Pat. No. 5,841,760 to Martin et al. FIG. 1 is a block diagram of the prior art SONET transport node previously described by Martin et al. FIG. 1 schematically illustrates the components involved in carrying four OC-48 trib systems over an OC-192 span from input T-Mux 40 to output T-Mux 50, using a "nailed up" OC-192 P-channel trib protection type. In this nailed up case example, each trib P-channel is carried over an OC-192 P-channel without OC-192 protection switching enabled. The operation for a forward direction is illustrated and described below for simplification. The T-Mux pair 40, 50 operates similarly for the reverse traffic. Throughout, the reference K is used to indicate the number of tributary systems carried across the transport node.

T-Mux 40 comprises K=4 trib input ports 61–64, each input port receives an incoming SONET formatted optical signal OC-48#1–4 over a respective input span 51, 53, 55, and 57 and converting same to an input STS-48#1–4. Trib input ports 61–64 perform SONET physical layer operations, clock recovery/synthesis, descrambling, framing, manipulating the section overhead and the line overhead, demultiplexing the STS-48, and synchronization of the STS paths with the local clock provided by a synchronization unit 72, and transmitting the input STS-1s to a STS-1 Manager 65. Optionally, as the requirements of each trib system dictates, forward error correction may also be performed.

A trib transport overhead (TOH) processor 60 receives the SOH and LOH bytes of all input STS-48s and processes these bytes respectively, terminating some and passing through others, all as set out in Applicant's U.S. Pat. No. 5,841,760. As described more fully below, the present invention relates to an improvement in the processing of signal degrade information, particularly SOH byte B1 and LOH byte B2.

As set out in Applicant's U.S. Pat. No. 5,841,760, and common to the present invention, each section BIP-8 byte B1 for the four trib systems is terminated such that the T-Mux 40 appears as a pseudo-repeater to facilitate fault isolation. Any signal degrade as indicated by section errors that occurs on a respective input span is replicated at the respective output span as discussed by Martin et al. Line BIP-8 byte B2 is also terminated for each respective trib input. Again, any line errors which occur on an input span are replicated at the respective output span so that the trib systems can perform signal degrade (SD) protection switching and performance monitoring.

A POH monitor 68 accesses the POH of each trib system. The trib STS POH is passed through to comply with the definition of transparency; however, some of these bytes are monitored for faults and alarms, as taught by Martin et al.

In accordance with the prior art, a fault monitor 70 is provided for detecting errors on the input span and transmitting them to the far-end T-Mux 50, so that the trib systems detect errors appropriately. For each of the K input spans, fault detector unit 70 receives the BIP-8 bytes B1, B2 and B3, counts the section/line/path code violations (CV) for the trib systems, and performs comparisons with a provisioned line signal degrade (SD) threshold. Exceeding the threshold constitutes an SD in protection terminology. This information is passed to a transmit supercarrier TOH processor (SC TOHP) 66, which generates a T-Mux signal degrade information message ($Msg_K$) comprising K coded bytes, one to indicate the bit error rate ($BER_K$) of each input span. The $Msg_K$ byte is inserted in the K2 timeslot of STS-1#9 of each trib system.

The fault detector 70 also monitors each tributary input for hard failure, and if detected, triggers line AIS insertion over the trib signal portion of the OC-192 SC. As described more fully below, the present invention relates to an improvement in the operation of the fault detector 70 as it relates to signal degrade information passthrough.

STS-1 Manager unit 65 is responsible for interchanging the STS-1s from the tribs, in order to permit the use of the SC TOH in STS-1#1. Applicant's U.S. patent provides illustrative examples of how STS-1s of OC-48/OC-12/OC 3 trib systems are arranged in the OC 192 supercarrier. In the case of OC-48, Martin et al. proposes that the OC-48 trib feed whose STS-1#1 coincides with SC STS-1#1 is swapped in entirety (both the OH and the payload) with STS-1#13 (or any STS-1 not normally carrying TOH).

The SC TOHP 66 passes the trib TOH bytes from the Trib TOH Processor 60 and aligns each byte into the correct timeslot before passing same to a supercarrier (SC) output port 71. STS-1 Manager 65 routes the 4×48 component STS-1s received from the respective trib input port to SC output port 71 for multiplexing the STS-1s into the output supercarrier.

The SC output port 71 receives the output STS-1s from STS-1 Manager 65 and the SC TOH from SC TOHP 66, multiplexes the STS-1s into the supercarrier STS-192, adds the SC TOH, and is also responsible for scrambling, converting the output STS-192 to the optical supercarrier OC-192, and transmitting it on fiber 30. The SC output port 71 also performs clock synthesis based on the local clock from synchronization unit 72. An SC input port 91 at output T-Mux 50 receives the optical supercarrier OC-192 on fiber span 30 and converts it to an input STS-192. SC input port 91 performs SONET physical layer operations, clock recovery/synthesis, descrambling, stripping the SC TOH, demultiplexing, synchronization of the STS paths with the local clock provided by a synchronization unit 92, and transmitting the incoming STS-1s to a STS-1 Manager 85.

An SC receive overhead processor (SC ROHP) 86 receives the respective SOH and LOH bytes of the SC TOH and passes the trib TOH to trib TOH processor (TOHP) 80.

In accordance with the prior art, the trib TOH processor 80 extracts the T-Mux $Msg_K$ byte. Using a look-up table, each T-Mux value indicates the rate of errors that must be replicated on the outgoing trib signal. The errors are introduced by appropriately inverting B1 and B2 values prior to transmission. The remaining trib TOH is either passed through as received or generated as needed because it was terminated at T-Mux 40. An improved $Msg_K$ byte monitoring process in accordance with the invention will now be described. A POH monitor 88 accesses the POH bytes, but again, leaves them unchanged. These bytes are only monitored for faults and alarms as described above. A fault monitor 90 monitors the OC-192 SC TOH for B2 errors as a result of errors on the OC-192 span and passes an error count to the trib TOH processor 80, which incorporates the OC-192 errors into the corrupted B1 and B2 values sent to each trib output port. For a hard failure on the OC-192 SC, the fault detector triggers the insertion of line AIS on all output tribs via the trib TOH processor.

STS-1 Manager 85 routes the component STS-1s of the supercarrier to a respective output port 81–84 for multiplexing the STS-1s into the outgoing OC-48s. STS-1 Manager 85 also swaps STS-1 #13 back to STS-1 #1, or as the case may be for some other granularity of input tributaries. A destination trib system receives its respective OC-48 through one of the four trib output ports 81–84. Each trib output port 81–84 is responsible for receiving the outgoing STS-1s from STS-1 Manager 85, multiplexing the STS-1s into an output STS-48, adding the trib TOH received from Trib TOH Processor 80, scrambling, converting the STS-48 signal to the respective outgoing optical signal OC-48, and transmitting it on the respective output span. The trib output ports also perform clock synthesis based on a local clock of a synchronization unit 92.

The invention described in Applicant's U.S. Pat. No. 5,841,760 enables the rudimentary passthrough of signal degrade information. For each of the K signals, signal degrade passthrough information is compiled along with fault detection in accordance with SONET maximum detection time standards at the upstream T-Mux. The information is coded in K message: bytes ($Msg_K$) mapped onto a supercarrier in otherwise unused overhead and transported over the high-rate span to the downstream T-Mux. Each $Msg_K$ is received and decoded. The corresponding signal is then degraded in accordance with the signal degrade information passed through.

The present invention improves the process set out in that patent by decoupling the signal degrade compilation from signal degrade threshold fault monitoring, thus accelerating information passthrough. Improved information coding is also provided in accordance with the invention. In addition, the invention provides message synchronization for increased assurance of information passthrough.

Figure 2A:
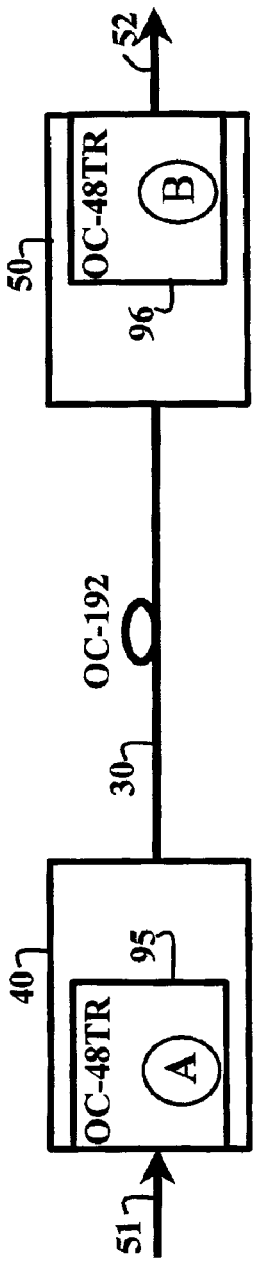
FIG. 2a is block diagram of transparent nodes in accordance with the invention.
Figure 2B:
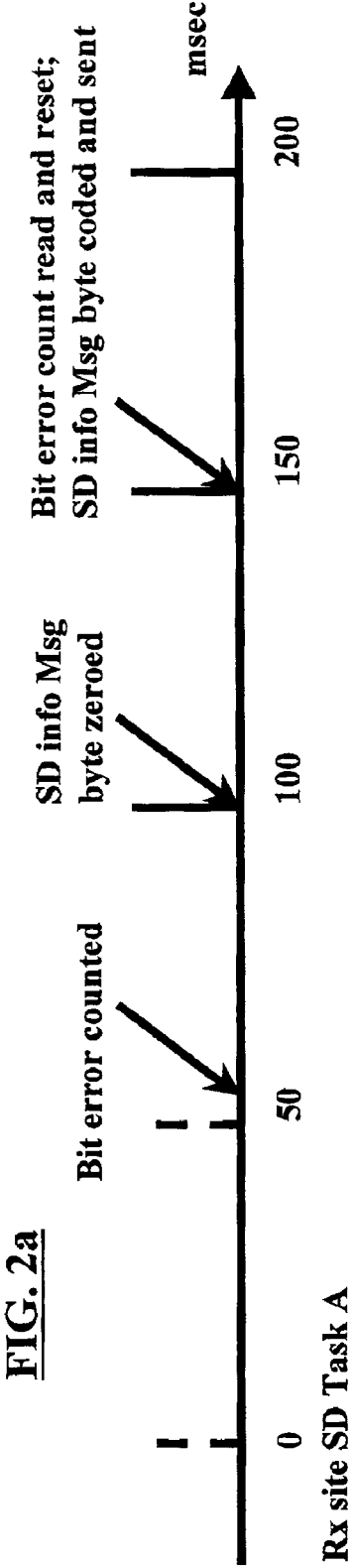
FIG. 2b is a schematic time-line diagram showing Signal Degrade passthrough in accordance with the invention.

As shown in FIG. 2, which illustrates a schematic T-Mux pairing and time-line diagram showing signal degrade passthrough timing in accordance with the invention, a representative trib input span 51 is connected to upstream T-Mux 40. Trib input port 61, TOHP 60, fault monitor 70, POH monitor 68, STS-1 Manager 65, shown in FIG. 1, may be collectively provisioned from a transceiver for OC-48 signals, designated OC-48TR 95 shown in FIG. 2. The transceiver 95 prepares the incoming OC-48 signal for multiplexing by T-Mux 40 over high-rate (OC-192) span 30. Similarly, downstream T-Mux 50 is includes an OC-48TR 96. OC-48TR 96 includes a trib output port 52, STS-1 Manager 85, POH monitor 88, fault detector 90 and trib TOH processor 80 (shown in FIG. 1) that receives demultiplexed STS-48 frames for processing and transmitting back into the respective trib system over trib output span 62.

FIG. 2 further schematically illustrates processes Receive Site Signal Degrade Task A (Rx site SD Task A) and Transmit Signal Degrade Domain Task B (Tx site SD Task B) and timelines for propagating signal degrade information from T-Mux 40 to T-Mux 50. While the example illustrates a single input, it is understood that the signal degrade passthrough operates for each of the K input trib signals received by T-Mux 40. Moreover, the invention is not limited by the example optical carrier rates.

In accordance with the invention, during operation, Task A operates to compile signal degrade (SD) information by sampling SD indicia, such as bit errors, over a relatively short fixed sampling period, independent of fault detection, for passing through in $Msg_K$ bytes. The sampling period is more frequent than maximum fault detection periods stipulated by SONET standards. SONET standards permit up to 10,000 seconds to detect a BER of 10e-9. While in practice BER detection times are substantially less than the maximum allowed times, aggregated information indicating infrequent errors may be inordinately delayed when propagated. The delay potentially doubles the downstream detection time for a trib system or may cause lost data altogether, thus producing inaccurate information. Consequently, a signal degrade information process that passes data aggregated over shorter sampling periods is preferred. As understood by those skilled in the art, the sample period should not be too short so as to overburden the transceiver with unnecessary processing.

Signal degrade indicia, (e.g. code violations or bit errors from B1 and B2 BIP-8 calculations) are aggregated on a running total basis as the STS-48 frames arrive via span 30. The signal information is propagated in a Msg byte to the downstream T-Mux 50 after every 100 msec sample period. It is not possible to pass the raw error count in a single byte message when the number of errors received is larger than a byte. The Msg byte is thus encoded with a code that is representative of BER. In accordance with the invention, the code may represent a raw error count for counted errors below a threshold, and otherwise a table index value representative of approximate BER, including signal failure is used in place of an raw error count. The threshold may be set with a view to the associated BER for a given raw count over the sampling period. For example, for OC-48 rates a threshold of about 127 raw errors provides that errors below about 5E-7 are propagated without approximation and errors above are approximated, preferably with about a half-decade accuracy.

For an OC-48 signal, Table 1 illustrates BER with half-decade accuracy for a given number of errors received in a 100 msec sampling period together with a table lookup index value.

TABLE 1

| Index | Bit Errors | BER Equivalent |
|---|---|---|
| 0 | 0 | No Error |
| 1 | 1 | Single Bit Error |
| 2 | 3 | ~1e-8 |
| 3 | 12 | ~5e-8 |
| 4 | 25 | ~1e-7 |
| 5 | 124 | ~5e-7 |
| 6 | 249 | ~1e-6 |
| 7 | 1536 | ~5e-6 |
| 8 | 2688 | ~1e-5 |
| 9 | 12288 | ~5e-5 |
| 10 | 24960 | ~1e-4 |
| 11 | 124416 | ~5e-4 |
| 12 | 248832 | ~1e-3 |

Of course, a quarter-decade window for rounding purposes on either side of the half-decade raw error count may be provisioned to assist in determining the BER approximation such that a raw error count of 10000, for example, may equate to a 5e-05 BER rather than 1e-05.

Table 2 below illustrates a possible Msg byte assignment in accordance with this aspect of the invention.

TABLE 2

| MSB | Bits 0–6 | Interpretation |
|---|---|---|
| 0 | 0 | No error bits |
| 1 | 0 to 126 | Output 1 to 127 errored bits |
| 0 | Msg Index | Approx. BER index from look-up table |
| 1 | 0x7f | BER > 1e-3 (SF) or LAIS |

In order to propagate the signal information, every 50 msec (i.e. a portion of the sample period), Task A cycles to code a $Msg_K$ byte according to one of two alternate methods. In a first method, the sampled signal degrade information (total error count) is read and cleared and a signal degrade information message is encoded as per the above Table 2. In the second method, a synchronization message indicating no signal degrade information is encoded. The $Msg_K$ is thus alternately equated to either the signal degrade information message or the synchronization message.

The Msg is then mapped into an otherwise unused timeslot of trib signal overhead, as described in Applicant's prior art patent referenced above, for transmission to the downstream T-Mux 50 and is thereafter multiplexed and transmitted by T-Mux 40.

In order to receive a Msg, the downstream T-Mux 50 examines the signal overhead every 50 msecs (i.e. half sampling period) for signal degrade information. Task B receives demultiplexed trib overhead and examines the pre-selected timeslot for Msgs to see if there has been a change in the value of the encoded message since the last review. A change of value should be detected between each coded error count and synchronization message. For each change, Task B decodes the message and may insert faults to degrade the outgoing trib signal on span 52 as may be appropriate.

FIG. 2 illustrates the timing relation of Task A and Task B. Keeping in mind that errors are aggregated for 100 msec periods and that Tasks A and B cycle independently every 50 msecs. FIG. 2 shows a bit error recorded and counted at about 53 msecs. Though not shown, throughout Task A time 50–100, T-Mux 40 transmits the Msg previously generated at time 50 (not shown). Task A cycles at time 100 and on this cycle zeros the Msg byte for transmission over the next cycle. The zero value acts as a synchronization message to the downstream T-Mux indicating that the next non-zero T-Mux Msg is new signal degrade information. In this way, if identical signal degrade information is generated in back-to-back periods, T-Mux 50 easily detects the information without ambiguity about whether it is a repeated message or a new message.

Task B cycles independently of Task A on its own cycle of preferably 50 msec. Some time after T-Mux 40 transmits the zero value Msg byte, Task B receives the byte in trib overhead at T-Mux 50, and compares it to the previously received Msg byte. Task B inserts faults on outgoing signals whenever there is a change in the Msg received. It decodes the byte according to the coding of Table 2 above and inserts the appropriate errors. Of course, for a zero error synchronization message, no errors need be inserted into outgoing signals, so Task B waits for 50 msec to receive a next Msg.

Meanwhile Task A cycles again at time 150 reading and resetting the current error count and prepares a non-zero Msg byte according to Table 2 for transmission. The error count is also reset for the next sampling. Task B thereafter cycles, receives the non-zero byte and acts accordingly. Given the independence of the Tasks A and Task B and the desire to avoid two-way messaging between the tasks indicating acknowledgement of received messages, synchronization messaging provides a simple means of control. Should Task B cycle twice before Task A cycles, Task B will not erroneously misinterpret the Msg byte.

It is understood that reverse signal degrade propagation from T-Mux 50 to T-Mux 40 is accomplished in a similar way. As both OC-48 transceivers 95 and 96 by definition operate to receive and transmit trib signals, each performs the functions of Task A and Task B. Thus when Task A and Task B are implemented on the same transceiver, they may be combined. The following pseudo-code illustrates a T-Mux Signal Degrade task:

Run every 50 msecs:

1. Process incoming Msg:
   On each execution cycle, read Msg received from the other T-Mux; and
   If the value has changed, call fault injection process with Msg value. (Note a Msg value of 0 will cause no fault injection).
2. Process incoming Bit Errors:
   On every other execution cycle (i.e. every 100 msecs), read and reset the accumulated error count; encode Msg byte; or
   On alternate execution cycle (i.e. every 100 msecs with a 50 msec shift from above), clear Msg.

This solution assumes that the required integration or averaging needed to perform error burst smoothing for Signal Degrade Protection switching will be done by the subtending OC-48 systems.

While specific embodiments of the invention have been described and illustrated, these embodiments should be considered illustrative of the invention only, and not as limiting the invention as construed in accordance with the accompanying claims.

I claim:

1. In a telecommunication system for transporting a telecommunication signal comprising signal overhead and payload between a multitude of sites, a method of propagating to a second site signal degrade (SD) information related to a signal received at a first site, the method comprising steps of:

sampling the signal received for SD indicia over a sampling period to determine SD information at the first site;

encoding, at the first site, a SD message indicating either the SD information as sampled or a synchronization code; and mapping, at the first site, the SD message into a timeslot of signal overhead, for transport to the second site;

wherein the sampling period is selected to provide SD information passthrough in accordance with predetermined performance monitoring criteria.

2. The method as claimed in claim 1 further comprising steps of:

monitoring, at the second site, the timeslot of signal overhead in the signal received for a change in a value of the SD message; and if the value has changed, decoding the SD message to determine the SD information.

3. The method as claimed in claim 2 further comprising a step of:

generating a SD condition corresponding to the decoded SD information in signal overhead of a signal transported to another site in the telecommunications system.

4. The method as claimed in claim 1 wherein the signal degrade indicia are bit errors.

5. The method as claimed in claim 4 wherein the step of encoding comprises the step of:

encoding the SD message with a value indicative of an exact bit error count if a count of bit errors on the trib signal for the sampling period is less than a threshold value and, otherwise, encoding the SD message with a value indicative of an approximation of the error count.

6. The method as claimed in claim 2 wherein the signal degrade indicia are bit errors.

7. The method as claimed in claim 2 wherein the step of encoding comprises a step of:

encoding the SD message with a value indicative of an exact bit error count if a count of bit errors on the trib signal for the sampling period is less than a threshold value and, otherwise, encoding the SD message with a value indicative of an approximation of the error count.

8. The method as claimed in claim 1 wherein the step of encoding comprises encoding the SD message with the SD information for mapping for a first portion of a next sampling period and encoding the SD message with a synchronization code indicating no SD information for mapping for a remainder of the next sampling period.

9. The method as claimed in claim 2 wherein the step of encoding comprises encoding the SD message with the SD information for mapping for a first portion of a next sampling period and encoding the SD message with a synchronization code indicating no SD information for mapping for transporting for the remainder of the next sampling period.

10. The method as claimed in claim 1 wherein said first and second sites each comprise a transparent multiplexer/demultiplexer (T-Mux) for transparently transporting a plurality (K) of said telecommunication signals between said first and second sites over a high-rate span, each of said K signals travelling on a corresponding tributary (trib) telecommunication system and wherein each of the steps are respectively performed for each of the corresponding K signals.

11. The method as claimed in claim 2 wherein said first and second sites each comprise a transparent multiplexer/demultiplexer (T-Mux) for transparently transporting a plurality (K) of said telecommunication signals between said first and second sites over a high-rate span, each of said K signals travelling on a corresponding tributary (trib) telecommunication system and wherein each of the steps are respectively performed for each of the corresponding K signals.

12. A method of propagating a bit error rate (BER) for each trib signal received from a plurality (K) of trib systems for transporting trib signals between a multitude of sites, all trib systems having in common a first and second site, the trib signals being multiplexed onto a supercarrier signal carried between said first and second sites over a high-rate span with no change in the provisioning of any of said trib systems, the method comprising performing at the first site steps of:

sampling each trib signal received for any bit errors over a predetermined sampling period to determine SD information for each signal;

encoding a SD message ($Msg_K$) for each signal indicating either SD information or a synchronization code; and mapping $Msg_K$ into a timeslot of signal overhead for transporting to the second site;

wherein the predetermined sampling period is selected to provide SD information passthrough in accordance with predetermined performance monitoring criteria.

13. The method as claimed in claim 12 wherein the step of encoding comprises encoding $Msg_K$ with the SD information for mapping for a first portion of a next sampling period and encoding $Msg_K$ with a synchronization code indicating no SD information for mapping for a remainder of the next sampling period.

14. The method as claimed in claim 12 wherein the step of encoding comprises steps of, for each of the K trib signals:

encoding $Msg_K$ with a value indicative of an exact error count if a count of bit errors on the trib signal for the sampling period is less than a threshold value; and otherwise, encoding $Msg_K$ with a value indicative of an approximation of the error count.

15. The method as claimed in claim 12 further comprising performing at said second site steps of:

monitoring each respective $Msg_K$ mapped into the supercarrier signal received from said first site for a change in value; and, if the value has changed, decoding $Msg_K$ to determine the SD information for each trib signal.

16. The method as claimed in claim 15 further comprising further performing at the second site a step of:

generating bit errors corresponding to the decoded SD information in respective trib signal overhead of a trib signal transported back into the respective trib telecommunication system.

17. The method as claimed in claim 12 wherein the supercarrier signal comprises trib signal operation, administration, maintenance and provisioning (OAM&P) information and supercarrier OAM&P information, and the step of mapping comprises mapping $Msg_K$ into a timeslot of trib signal OAM&P information.

18. The method as claimed in claim 12 wherein each of the K trib signals is a SONET OC-N signal.

19. The method as claimed in claim 18 wherein the step of sampling comprises processing BIP-8 bytes from each trib signal OAM&P information for providing a trib bit error count for each trib signal as SD information.

20. The method as claimed in claim 12 wherein the sampling period is 100 milliseconds.

21. The method as claimed in claim 12 wherein the supercarrier signal is a SONET OC-N signal having a capacity sufficient to carry said K trib signals when multiplexed, said supercarrier signal comprising a supercarrier synchronous payload envelope (SPE) and a supercarrier overhead (OH) and wherein the step of mapping comprises mapping each said $Msg_K$ into a respective reserved timeslot of the supercarrier overhead.

22. In a transparent multiplexer/demultiplexer for transparently transporting a plurality (K) of trib signals between a first and second site over a high-rate span, the trib signals comprising forward trib signals multiplexed onto a forward supercarrier signal for transmission and reverse trib signals demultiplexed from a reverse super carrier signal upon reception, a system of propagating signal degrade (SD) information of each trib signal comprising:

means for sampling each of the forward trib signals for counting any bit errors over a sampling period to determine SD information;

means for encoding a SD message ($Msg_K$) indicating either SD information or a synchronization code; and means for mapping $Msg_K$ into a timeslot of signal overhead of the forward supercarrier signal for transport to the second site;

wherein the sampling period is selected to provide SD information passthrough in accordance with predetermined performance monitoring criteria.

23. The system as claimed in claim 22 wherein the means for encoding comprises means for coding $Msg_K$ with the SD information for mapping for transporting for a first portion of the next sampling period and means for coding $Msg_K$ with a synchronization code indicating no SD information for mapping for transporting for the remainder of the next sampling period.

24. The system as claimed in claim 22 wherein the means for encoding comprises, for each of the K trib signals:

means for encoding $Msg_K$ with a value indicative of an exact error count if a count of bit errors on the trib signal for the sampling period is less than a threshold value; and otherwise, means for encoding $Msg_K$ with a value indicative of an approximation of the error count.

25. The system as claimed in claim 22, further comprising, at said second site:

means for monitoring each respective $Msg_K$ mapped into the supercarrier signal received from said first site for a change in value; and, means for decoding $Msg_K$ to determine the SD information for each trib signal when the change in value is detected.

26. The system as claimed in claim 25 further comprising, at the second site:

means for generating bit errors corresponding to the decoded SD information in respective trib signal overhead of a trib signal transported back into the respective trib telecommunication system.

27. The system as claimed in claim 22 wherein the supercarrier signal comprises trib signal operation, administration, maintenance and provisioning (OAM&P) information and supercarrier OAM&P information, and the means for mapping comprises means for mapping $Msg_K$ into a timeslot of trib signal OAM&P information.

28. The system as claimed in claim 22 wherein each of the K trib signals is a SONET OC-N signal.

29. The system as claimed in claim 28 wherein the means for sampling comprises means for processing BIP-8 bytes from each trib signal OAM&P information for providing a trib bit error count for each trib signal as SD information.

30. The system as claimed in claim 22 wherein the sampling period is 100 milliseconds.

31. The system as claimed in claim 22 wherein the supercarrier signal is a SONET OC-N signal having a capacity sufficient to carry said K trib signals when multiplexed, said supercarrier signal comprising a supercarrier synchronous payload envelope (SPE) and a supercarrier overhead (OH) and wherein means for mapping comprises means for mapping each said $Msg_K$ into a respective reserved timeslot of the supercarrier overhead.

* * * * *